United States Patent [19]

Hughes, Jr.

[11] 4,055,351
[45] Oct. 25, 1977

[54] RESETTABLE TOY PHONOGRAPH

[76] Inventor: Alexander W. Hughes, Jr., 19 Wardell Circle, Oceanport, N.J. 07757

[21] Appl. No.: 747,485

[22] Filed: Dec. 6, 1976

[51] Int. Cl.² .................... G11B 17/06; A63H 3/33
[52] U.S. Cl. .................................. 274/15 R; 274/1 A
[58] Field of Search .................... 274/1 A, 9 R, 15 R, 274/15 A, 14

[56] References Cited

U.S. PATENT DOCUMENTS

| 3,411,790 | 11/1968 | Suchowski | 274/1 A |
| 3,479,037 | 11/1969 | Tomiyama | 274/9 R |
| 3,984,111 | 10/1976 | Hughes | 274/1 A |

*Primary Examiner*—Richard E. Aegerter
*Assistant Examiner*—John W. Shepperd
*Attorney, Agent, or Firm*—Hubbell, Cohen, Stiefel & Gross

[57] ABSTRACT

An improved resettable toy phonograph in which a phonograph record is mountable on a rotating turntable with sound being picked up from the record by a pivoted pickup arm. The pickup arm contains an upstanding protrusion which is received in an aperture in the lift arm at the end of the play of the record to enable the resiliently biased lift arm to be lowered toward the record a sufficient amount to enable the lift arm protrusion to engage the protrusion on the floating cam. The floating cam is biased into nesting engagement with a congruent cam fixedly mounted on the turntable for rotation therewith with both cams comprising a pair of spaced apart sloped peripherally engageable cam surfaces for enabling an equal distributed direct upward lift for the speaker cone assembly when the cams are driven out of nesting engagement. The stopping of the floating cam during rotation of the turntable causes the floating cam peripheral cam surfaces to ride up the corresponding sloped surfaces of the other cam thereby driving it out of nesting engagement therewith for raising the floating cam a sufficient amount to contact the speaker cone assembly and lift it out of biasing engagement with the pickup arm, the lift arm aperture being lifted above the protrusion on the pickup arm whereby the pickup arm, which is normally spring biased toward the periphery of the record, automatically returns to the periphery of the record and returns the lift arm to supporting contact with the protrusion on the pickup arm.

17 Claims, 5 Drawing Figures

RESETTABLE TOY PHONOGRAPH

CROSS-REFERENCE TO RELATED APPLICATIONS

This application is related to my previous U.S. Pat. No. 3,984,111 and to my copending U.S. patent application entitled "Dual Record Toy Phonograph," filed contemporaneously herewith on Dec. 6, 1976, and bearing U.S. Ser. No. 747,484.

BACKGROUND OF INVENTION

1. Field of Invention

The present invention relates to phonographs and particularly to the types of phonographs known as toy phonographs.

2. Description of the Prior Art

Toy phonographs, that is phonographs such as for use as talking voice boxes, such as for talking dolls or other types of so-called talking toys, such as talking alarm clocks, are well known. An example of such prior art toy phonographs is disclosed in U.S. Pat. Nos. 3,589,735; 3,208,755; 3,055,664; 3,467,393; 3,823,946; 3,401,942, 3,208,755; 3,544,115; 3,784,210; 3,984,111; Canadian Pat. No. 707,932; and British Pat. No. 828,608, by way of example. The entire field with respect to toy phonographs has been quite active with the primary motivation, because of their use in toys, being economics, efficiency and size so as to provide a practical commercial embodiment for use in economically viable children's toys. Thus, the above patents, provided by way of example, merely disclose a quantitatively small amount of the large volume of different types of toy phonographs existent in the prior art with the difference between the various prior art toy phonographs in an attempt to provide toy phonographs which are economically viable being relatively narrow since apparently minor improvements can provide a significant improvement in efficiency and economics in the area of toy phonographs. For example, my previous U.S. Pat. No. 3,984,111, over which the present invention is an improvement, employs a different approach from the prior art but may require manufacturing tolerances which could become undesirable in a mass production environment. The improved toy phonograph of the present invention overcomes these potential problems such as with respect to a mass production environment.

SUMMARY OF THE INVENTION

An improved resettable toy phonograph is provided. Such a toy phonograph comprises a housing, the housing comprising a base, a turntable rotatably mounted on the base for rotation about an axis of rotation, a pickup arm pivoted at one end and engageable with a playing surface of a phonograph record rotatably mounted on the turntable, the phonograph record having a periphery, a first spring means, the pickup arm being constantly placed under a force of the first spring means which urges the pickup arm toward the periphery of the phonograph record, a speaker cone means resiliently mounted on the housing above the pickup arm, and second spring means resiliently urging the speaker cone means into contact with the pickup arm with a biasing force for pressing the pickup arm into engagement with the phonograph record for reproducing recorded sound from the phonograph record playing surface. The improvement comprises a first cam means axially mounted on the turntable axis of rotation and fixedly rotatable therewith, a second cam means nestable with the first cam means for rotation therewith when in a nested engagement therewith, the second cam means being a floating cam means comprising at least one lower peripheral cam surface sloped with respect to the turntable, the first cam means having at least one congruent upper peripheral cam surface nestable with the second cam means lower peripheral cam surface, third spring means resiliently urging the second floating cam means lower peripheral cam surface into nesting engagement with the first cam means upper peripheral cam surface, the second floating cam means comprising a first protrusion extending outwardly therefrom beneath the speaker cone means parallel to the phonograph record playing surface and being normally biased out of engagement with the speaker cone means by the third spring means. In addition, the pickup arm comprises a second protrusion extending upwardly therefrom substantially normal to the phonograph record playing surface and being pivotally movable with the pickup arm with the speaker cone means comprising a lift bar means for enabling the speaker cone means to be urged out of engagement with the pickup arm by the second cam means as the nestable cam surfaces are driven out of nesting engagement. The second spring means resiliently urges the lift bar means into supporting contact with the pickup arm second protrusion, the lift bar means comprising a third protrusion extending downwardly therefrom substantially normal to the phonograph record playing surface and normally disposable above the rotating first protrusion when the lift bar means is in supporting contact with the pickup arm second protrusion. The lift bar means further comprises an aperture for receiving the second protrusion therein with the second protrusion being pivotally movable with the pickup arm.

The lift bar means aperture is located above the phonograph record adjacent the end of the phonograph record recording with the second protrusion being receivable in the lift bar means aperture when the pickup arm is adjacent the end of the phonograph record recording for enabling the resiliently urged lift bar means to drop a sufficient amount in the direction of the phonograph record to enable the first and third protrusions to become engageable for halting rotation of the second floating cam means when the pickup arm is adjacent the end of the phonograph record recording. The turntable and the first cam are still rotatable when the first and second protrusions are in engagement with the rotating first cam means upper peripheral cam surface being driven out of nesting engagement with the second cam means lower peripheral cam surface during rotation of the turntable when the first and third protrusions are in engagement. The second cam means sloped lower peripheral cam surface rises up the sloped first peripheral cam surface as the cam surfaces are driven out of nesting engagement to enable sufficient contact of the second cam means with the speaker cone means to overcome the second spring means biasing force and urge the speaker cone means out of engagement with the pickup arm to raise the lift bar means aperture above the second protrusion and enable the pickup arm to be resiliently reset to the periphery of the phonograph record by the first spring means while returning the lift bar means to supporting contact with the pickup arm second protrusion, thereby disengaging the first and third protrusions. The first cam means may comprise a pair of spaced apart upper peripheral cam surfaces with the second cam means comprising a corresponding pair of spaced apart lower peripheral cam surfaces with the lower peripheral cam surfaces substantially simultaneously rising up the corresponding sloped first peripheral cam surfaces as the cam surfaces are driven out of nesting engagement for providing a distributed upward lift force for the speaker cone means for urging the speaker cone means out of engagement with the pickup arm, such as by providing the pair of cam surfaces substantially 180° apart for providing a substantially equal distributed lift force for the speaker cone means. Moreover, the upper and lower peripheral cam surfaces of each corresponding pair are preferably substantially mirror images of each other.

In addition, the housing may comprise an overhang portion parallel to the phonograph record and located adjacent the end of the phonograph record recording between the lift bar means and the phonograph record with the overhang portion being spaced above the phonograph record playing surface a sufficient amount for enabling the pickup arm to be removably retained thereunder when the pickup arm second protrusion is received in the lift bar means aperture while subsequently enabling the pickup arm to be resiliently reset to the periphery of the phonograph record by the first spring means when the speaker cone means is urged out of engagement with the pickup arm to raise the lift bar means aperture above the second protrusion. Furthermore, the lift bar means may comprise an extension portion extending out of the housing for enabling manual resilient reset of the pickup arm to the periphery of the phonograph record by the first spring means at any position of the pickup arm along the phonograph record playing surface by lifting the extension portion, such as in conjunction with the operation of the on/off switch for the drive means which rotatably drives the turntable so as to insure that the recording starts at the beginning each time the device is turned on.

DETAILED DESCRIPTION OF PREFERRED EMBODIMENTS

Figure 1:
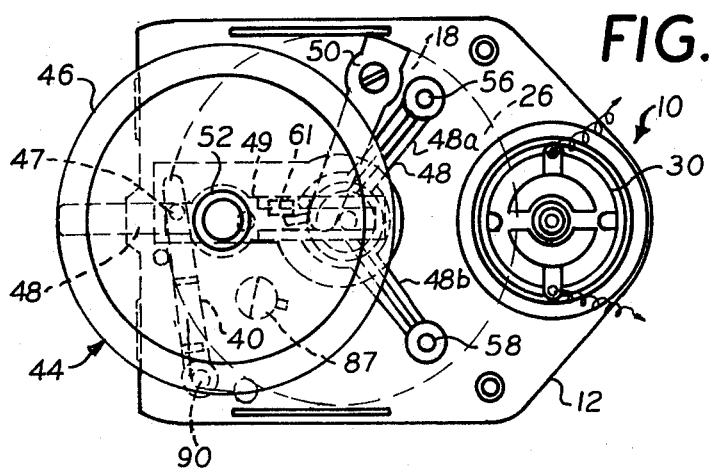
FIG. 1 is a top plan view of the preferred embodiment of the improved resettable toy phonograph of the present invention with the cover removed.
Figure 4:
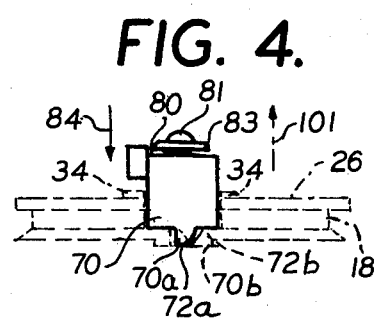
FIG. 4 is a fragmentary view, similar to FIG. 3, of the turntable portion of the embodiment of FIG. 1 assembled.
Figure 2:
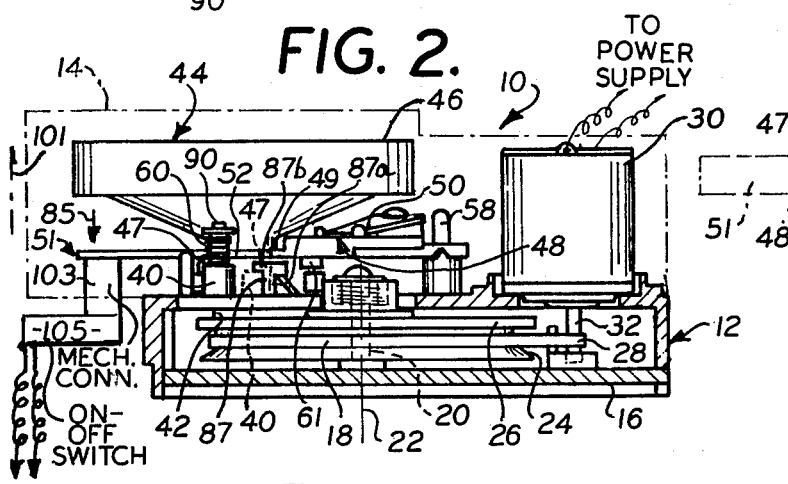
FIG. 2 is a partially cut away side elevation of the embodiment of FIG. 1 with the cover shown in position in dotted lines.
Figure 3:
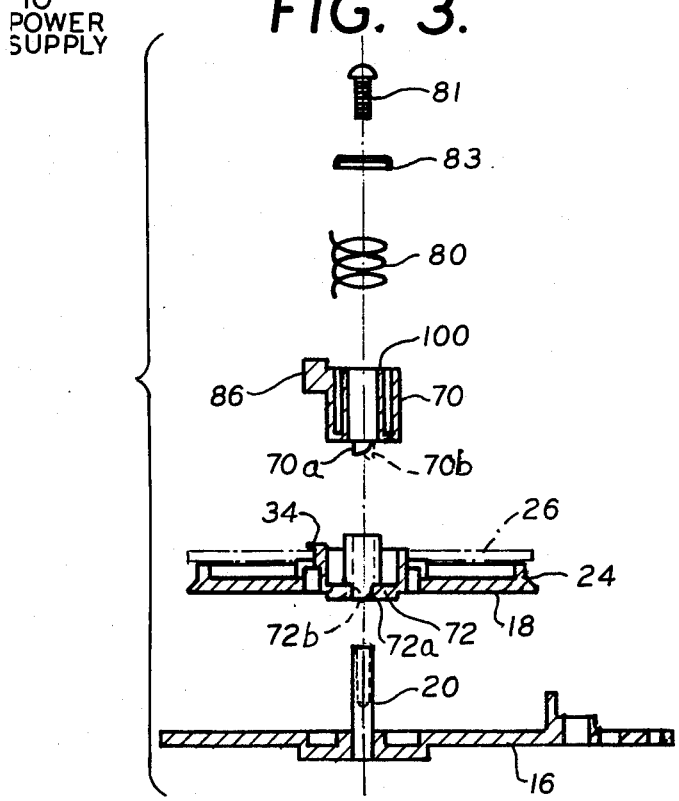
FIG. 3 is a fragmentary exploded view, partially in section, of the turntable portion of the embodiment of FIG. 1.

Referring now to the drawings in detail and initially to FIGS. 1 and 2 thereof, an improved resettable toy phonograph, generally referred to by the reference numeral 10, in accordance with the present invention is shown. As in previous conventional toy phonographs, such as the type described in U.S. Pat. No. 3,589,735, or as described in reference to my improved toy phonograph of the type described in U.S. Pat. No. 3,984,111, the phonograph comprises a housing 12 to which a cover 14, normally containing a speaker grill (not shown), is mounted conventionally such as by screws. The housing 12, as shown and preferred in FIG. 2, includes a base portion 16 which is preferably fixedly secured to the balance of the housing 12, such as by screws which are removable so as to allow access to the interior of the housing 12. A conventional turntable 18 is preferably rotatably mounted on the base 16 in housing 12 by means of a conventionally centrally located spindle or shaft 20 mounted to the base 16 (FIG. 3). The shaft 20 is located along the central axis 22 of the turntable 18. As shown and preferred in FIGS. 2 and 3, the configuration of the turntable 18 is such so as to form a groove 24 normal to the axis 22 of the shaft 20 in conjunction with a phonograph record 26 which is preferably removably mounted on the turntable 18 for rotation therewith. As also shown and preferred in FIG. 2, the groove 24 which preferably extends completely around the turntable 18, contains an endless belt, such as conventional rubberband 28, which is driven in conventional fashion by a DC motor 30 which receives power from a battery (not shown), with the motor 30 being conventionally turned on and off by means of a conventinal on/off switch (not shown). The drive is accomplished in conventional fashion by a knurled shaft 32 which extends from the motor 30 into the interior of the housing 12, with the rubberband or belt 28 extending around the shaft 32 and around the turntable 18 in groove 24 so as to create a belt drive type of conventional arrangement which is well known for the drive of battery powered toy phonographs. The phonograph record 26 is preferably a conventional plastic disc record such as the type conventionally utilized for talking voice boxes or toy phonographs, such as for use in dolls. As shown and preferred in FIG. 3, the phonograph record 26, which is preferably removable from the turntable 18 is preferably snap-fit onto the turntable 18 and is held in place by means of resilient plastic fingers 34, by way of example.

As also shown and preferred in FIGS. 1 and 2, the toy phonograph 10 of the present invention utilizes a conventional type of sound pickup mechanism for reproducing recorded sound from the phonograph record 26 playing surface. This conventional type of sound pickup mechanism, such as the type described in my previous U.S. Pat. No. 3,984,111 or in U.S. Pat. Nos. 3,589,735 or 3,054,664 or Canadian Pat. No. 707,932, preferably consists of a pickup arm 40 having a conventional phonograph needle 42 extending therefrom for contacting the playing surface of the phonograph record 26 and a speaker cone assembly 44 which, when in direct contact with the pickup arm 40 as shown in FIG. 2, conventionally reproduces sound from the phonograph record playing surface 26 picked up by the needle 42, providing this sound in conventional fashion by vibration of the speaker cone 46 forming part of the speaker cone assembly 44. However, the pickup arm 40 of the present invention, is different in configuration from the pickup arm described in my previous U.S. Pat. No. 3,984,111 in that pickup arm 40 herein does not have a hook portion parallel to the playing surface of the record and, moreover, preferably contains an upstanding protrusion 47, preferably substantially normal to the phonograph record playing surface 26. It is this protrusion 47 which, as will be described in greater detail hereinafter, is preferably integrally formed with the balance of the pickup arm 40 assembly, which preferably maintains the direct contact with the speaker cone assembly 44 for conventionally reproducing sound from the phonograph record playing surface 26 picked up by the needle 42.

Figure 5:
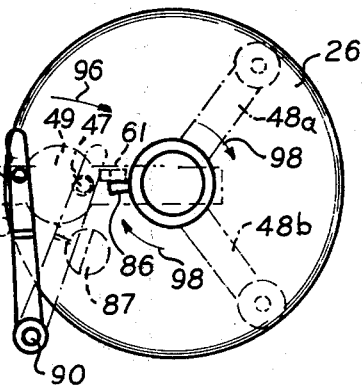
FIG. 5 is a fragmentary plan view of the pickup arm, lift arm and turntable portions of the embodment of FIG. 1 diagrammatically illustrating their interrelationship.

As also shown and preferred in FIGS. 1, 2 and 5, the speaker cone assembly 44 also preferably comprises a conventional type Y-shaped lift bar mechanism 48 for enabling the speaker cone 46 to be lifted out of and biased into engagement with the pickup arm 40 as is accomplished in conventional available toy phonographs, although, the specific camming mechanism for accomplishing the engagement and disengagement of the speaker cone assembly 44 with the pickup arm 40 as well as the manual reset capability of lift bar mechanism 48 is not conventional as will be described in greater detail hereinafter. As is shown and preferred in FIGS. 1, 2 and 5, the preferred lift bar mechanism 48 preferably includes an aperture 49 therein capable of removably receiving the upstanding protrusion 47 of the pickup arm 40 therein when the pickup arm 40 is pivotally moved into position and alignment with aperture 49 during the play of the phonograph record 26. The aperture 49 is preferably located above the phonograph record playing surface 26 adjacent the end of the phonograph record recording for enabling subsequent automatic reset of the pickup arm 40 to the periphery or beginning of the phonograph record 26 as will be described in greater detail hereinafter. In addition, as will also be described in greater detail hereinafter, the preferred Y-shaped lift bar mechanism 48 preferably comprises an integral extension portion 51 which extends beyond housing 12 in order to enable manual reset of the pickup arm 40 to the periphery or beginning of the phonograph record playing surface 26 at any position of the pickup arm 40 along the phonograph record playing surface 26. Such extension portion 51 is not present in my previously described improved toy phonograph disclosed in U.S. Pat. No. 3,984,111.

As shown and preferred in FIGS. 1 and 2, the pickup arm 40 is preferably biased, such as by a conventional leaf spring 50 bearing against the lift bar 48, which lift bar 48 is preferably fixedly secured to the speaker cone 46 at the center 52 thereof, into playing engagement with the phonograph record 26 playing surface, as shown in FIG. 2. The lift bar mechanism 48 and, hence, the entire speaker cone assembly 44 which moves as a unit, is slidably mounted via extension arms 48a and 48b of the Y-shape forming the lift bar 48 on posts 56 and 58, respectively, for slidable movement up and down therealong. A third point of contact or support of the lift bar 48 is made at point 52 which is in removable spring biased contact with the pickup arm 40 protrusion 47 as is shown and preferred in FIG. 2. As was previously mentioned, the spring 50 presses against the lift bar 48 and, thus, biases point 52 of the speaker cone assembly into direct contact with protrusion 47 on pickup arm 40 which then biases the needle 42 into playing engagement with the phonograph record playing surface 26. The pickup arm 40, via a conventional spring 60, is conventionally spring biased in a direction parallel to the playing surface of the phonograph record 26 toward the periphery thereof; however, the force of spring 50 is preferably sufficient to overcome the force of spring 60 so as to prevent the pickup arm 40, in conventional fashion, from moving toward the periphery of the phonograph record 26 during play while the speaker cone assembly 44 is in direct bearing contact with the protrusion 47 on pickup arm 40.

As shown and preferred in FIGS. 1 through 5, and particularly in FIG. 5, and as will be described in greater detail hereinafter, when the pickup arm 40 reaches the end of the phonograph record 26, that is the end of the recording, which is conventionally located adjacent the center of the record 26, protrusion 47 will seat in aperture 49 thereby removing the direct bearing contact of the speaker cone assembly 44 with the protrusion 47 on the pickup arm 40. At this point, a camming assembly will lift the speaker cone assembly 44 out of engagement with the pickup arm 40, such as by preferably raising the lift bar 48 a sufficient amount to lift aperture 49 above protrusion 47 on pickup arm 40, thereby unseating the protrusion 47 from aperture 49, so as to enable automatic reset of the pickup arm 40 to the periphery of the phonograph record 26 under the action of spring 60 and, subsequently, when this has been accomplished, return the speaker cone assembly 44 into direct bearing contact engagement with protrusion 47 of pickup arm 40 to enable replay of the recording. The camming assembly preferably comprises a downwardly extending protrusion 61 located at the bottom of the lift bar mechanism 48 and preferably integrally formed therewith, with the downwardly extending protrusion 61 also preferably being adjacent the end of the recording. In addition, the cam assembly also preferably comprises a floating cam 70, to be described in greater detail hereinafter, and a second cam 72 which is axially mounted on the turntable 18 axis of rotation and fixedly rotatable with the turntable 18. Cams 70 and 72 preferably comprise a pair of spaced apart cam surfaces 70a and 70b for cam 70 and 72a and 72b for cam 72 which are preferably located 180° apart about the periphery of cams 70 and 72, respectively, and are each respectively mirror images of each other as indicated by the dotted lines in FIGS. 3 and 4. As shown and preferred in FIGS. 3 and 4, cams 70 and 72 are nestable with each other for rotation therewith when in nested engagement. Moreover, the periphery of both cams 70 and 72 are preferably substantially circular in configuration, however, preferably having the aforementioned intermittent mirror image mateable camming surfaces 70a and 70b for cam 70 and 72a and 72b for cam 72 spaced approximately 180° apart about this circular periphery, with these camming surfaces 70a, 70b, 72a and 72b preferably being arcuately sloped and with cam surfaces 70a and 70b being referred to as upper peripheral cam surfaces and cam surfaces 72a and 72b being referred to as lower peripheral cam surfaces, and with upper peripheral cam surface 70a being substantially congruent to lower peripheral cam surface 72a and with upper peripheral cam surface 70b correspondingly being substantially congruent to lower peripheral cam surface 72b. Thus, these intermittent cam surfaces 70a–70b and 72a–72b are preferably provided herein as opposed to the continuous triangularly sloped cam surfaces described in my previous U.S. Pat. No. 3,984,111. Floating cam 70 is preferably biased into nesting engagement with cam 72 by means of a spring 80 held in place by a screw 81 which is threadably mounted to shaft 20 as illustrated in FIG. 3, with shaft 20 preferably extending through the interior of floating cam 70 and through the center of cam 72 and the turntable 18 and, which, by virtue of screw 81 in conjunction with cap 83, threadably secures the cam assembly 70–72 to the turntable 18 and subsequently to the base portion 16 for enabling rotatable drive of the turntable 18 about the shaft 20 with the entire arrangement being held in position about the central axis 22 for rotation thereabout. As shown and preferred in FIG. 4, this spring 80 biases the cams 70 and 72 into nesting engagement by applying a spring force in the direction of arrow 84.

As further shown and preferred in FIGS. 1 through 5, the floating cam 70 preferably includes an outwardly extending protrusion 86 which preferably extends outwardly parallel to the playing surface of the phonograph record 26 with the protrusion 86 preferably being unitary with the floating cam 70 so as to be rotatable therewith. Preferably, protrusion 86 is located beneath protrusion 61 and is out of engagement therewith when the lift bar mechanism 48 is in direct bearing contact with protrusion 47 on pickup arm 40. Howver, as will be described in greater detail hereinafter, when the pickup arm 40 has pivotally moved so as to enable protrusion 47 to seat in lift bar aperture 49, the direct bearing contact of lift bar 48 against protrusion 47 is removed and spring 50 biases lift bar 48 downwardly in the direction of arrow 85 which, because of the height of protrusion 47 above the planar top surface of the balance of the pickup arm 40, enables the lift bar 48 to drop a sufficient amount in the direction of the phonograph record playing surface 26 to enable protrusions 61 and 86 to become engageable for halting rotation of the floating cam 70, as will be described in greater detail hereinafter, which, thus occurs when pickup arm 40 is adjacent the end of the phonograph record recording. Such engagement of protrusions 61 and 86 is illustrated in FIG. 5.

In addition, as shown and preferred in FIG. 2, an additional upstanding member 87 is provided adjacent the end of the phonograph record recording which extends from housing 12 above the phonograph record playing surface 26 and is preferably located between the lower surface of the lift bar mechanism 48 and the phonograph record playing surface 26. Member 87 preferably comprises a portion 87a which extends substantially normal to the playing surface and acts as a stop member for the pickup arm 40 when it reaches the end of the recording, and an overhang portion 87b which extends substantially parallel to the playing surface of phonograph record 26. Overhand portion 87b is preferably located at a sufficient height so as to enable the top surface of the pickup arm 40 from which protrusion 47 extends to be seated therebeneath when protrusion 47 is seated in aperture 49. Preferably, the height of overhand 87b is sufficient to enable some space to exist sufficient to enable movement of the pickup arm 40 pivotally into and out of engagement against stop member 87a while restraining upward movement opposite the direction of arrow 85 of the pickup arm 40. The primary purpose of overhang 87b is to prevent the pickup arm 40 from lifting up with the speaker cone assembly 44 when the speaker cone assembly 44 is raised due to cams 70 and 72 being driven out of nesting engagement with each other. However, as previously mentioned, the height of the overhang portion 87b is sufficient to enable the pickup arm 40 to be resiliently returned to the periphery of the record 26 by the action of spring 60 when the camming assembly 70-72 being driven out of nesting engagement raises the lift arm 48 a sufficient amount to raise aperture 49 above protrusion 47.

Referring now to FIGS. 1, 2, 4 and 5, the operation of the camming assembly 70-72 in conjunction with the lift bar mechanism 48 and protrusion 47 on pickup arm 40 to lift the speaker cone assembly 44 out of engagement with the pickup arm 40 to enable automatic reset of the pickup arm 40 to the periphery of the record 26 shall now be described. The pickup arm 40, is conventionally pivotally mounted, such as at pivot point 90, on the housing 12. As was previously described, the pickup arm 40 is biased in conventional fashion into playing engagement with the phonograph record 26 playing surface via the speaker cone assembly 44 with which it is in direct bearing engagement due to lift bar mechanism 48 bearing against protrusion 47 to enable reproduction of the recorded sound. The pickup arm 40 conventionally moves along the record groove towards the center of the record 26, as indicated by arrow 96, to reproduce the sound recorded on the record 26 as the turntable 18, and hence, the phonograph record 26, rotates due to the belt drive 28. During this time, cam surfaces 70a-70b and 72a-72b of cams 70 and 72, respectively, are in nesting engagement and thus, simultaneously rotate together. During such simultaneous rotation, the protrusion 86 is situated so as to be rotatable beneath the lift bar 48 as well as beneath protrusion 61 extending downwardly from lift bar 48 so as to be out of contact with the speaker cone assembly 44. As the pickup arm 40 nears the end or center of the phonograph record 26, protrusion 47 aligns with aperture 49 in lift bar 48 and seats therein. This removes the direct bearing engagement of lift bar mechanism 48 against protrusion 47 and spring 50 resiliently urges lift bar mechanism 48 in the direction of arrow 85 downwardly until the lift bar mechanism rests against the top surface of the pickup arm 40 from which protrusion 47 extends. This lowers the pickup arm 40 a sufficient amount to enable protrusion 61 to be placed in the path of rotating protrusion 86 so that these protrusions can be placed in engagement with each other and, accordingly, as protrusion 86 rotates it subsequently bears against protrusion 61 to halt the rotation of protrusion 86, with the phonograph record 26 continuing to be driven by motor 30 for rotation in a directon of arrow 98. This engagement of protrusions 61 and 86 prevents the floating cam 70 from further rotation. However, the bottom cam 72 which is fixedly rotatable with the turntable 18 continues to rotate due to the drive of motor 30. This continued rotation of the bottom cam 72 while the floating cam 70 is now held stopped against rotation causes the floating cam 70 cam surfaces 70a and 70b to ride up the sloped surfaces 72a and 72b, respectively, of bottom cam 72, overcoming the spring force of spring 80, to the top of the arcuate cam surfaces 72a and 72b. The height or total rise of the arcuate sloped surfaces 72a and 72b is sufficient to enable contact of the top surface 100 of the floating cam 70 with the lift bar 48 and to lift it a sufficient amount in the direction of arrow 101 to lift aperture 49 above the top of protrusion 47 and enable the spring loaded pickup arm or needle arm 40 to no longer be in contact with the speaker cone assembly 44 and thus enable the spring loaded needle or pickup arm 40 to reset to its starting position at the periphery of the phonograph record 26 under the action of spring 60. The extent and location of the cam surfaces is preferably sufficient to enable the pickup arm 40 to completely return to the starting position at the perihery of the phonograph record 26. When this is accomplished, as the bottom cam 72 continues to rotate, the floating cam 70 returns to nesting engagement with cam 72 by dropping back into the groove defining cam surfaces 72a and 72b, respectively, thus removing the force in the direction of arrow 101 and reestablishing direct bearing contact between the speaker cone assembly 44 and protrusion 47 on pickup arm 40 due to spring 50 again pressing the speaker cone assembly 44 and the pickup arm 40 into playing engagement with the phonograph record 26 playing surface.

As further shown and preferred in FIGS. 1, 2 and 5, and as previously mentioned, lift bar mechanism 48 also preferably includes an integral extension portion 51 for enabling manual reset of the pickup arm 40 to the periphery of the record 26 at any time during the play thereof, such as before the pickup arm 40 reaches the end of the record so as to enable the aforementoned automatic reset operation to occur in conjunction with the seating of protrusion 47 in aperture 49. This extension 51 enables a force to be applied in the direction of arrow 101 at the end of extension portion 51 to lift the pickup arm 40 out of bearing engagement with protrusion 47, thereby enabling spring 60 to resiliently return pickup arm 40 to the beginning or periphery of the record 26. This may preferably be accomplished in conjunction with the turning on and off of the drive motor 30 by means of a conventional mechanical interconnection 103 between the conventional on/off switch 105 for the power supply for motor 30 on which switch mechanical interconnection 103, by way of example, would raise lift bar 48 in the direction of arrow 101 when the switch is moved to the off position, thereby insuring that the record will always start at the beginning thereof when the phonograph 10 is turned on.

What is claimed is:

1. In a toy phonograph comprising a housing, said housing comprising a base, a turntable rotatably mounted on said base for rotation a phonograph record mounted on said turntable about an axis of rotation, a pickup arm pivoted at one end and engageable with a playing surface of said phonograph record, said phonograph record having a periphery, a first spring means, said pickup arm being constantly placed under a force of said first spring means which urges said pickup arm toward the periphery of said phonograph record, a speaker cone means resiliently mounted on said housing above said pickup arm, and second spring means resiliently urging said speaker cone means into contact with said pickup arm with a biasing force for pressing said pickup arm into engagement with said phonograph record for reproducing recorded sound from said phonograph record playing surface; the improvement comprising a first cam means axially mounted on said turntable axis of rotation and fixedly rotatable therewith, a second cam means nestable with said first cam means for rotation therewith when in nested engagement therewith, said second cam means being a floating cam means comprising at least one lower peripheral cam surface sloped with respect to said turntable, said first cam means having at least one congruent upper peripheral cam surface nestable with said second cam means at least one lower peripheral cam surface, third spring means resiliently urging said second floating cam means at least one lower peripheral cam surface into nesting engagement with said first cam means at least one upper peripheral cam surface, said second floating cam means comprising a first protrusion extending outwardly therefrom beneath said speaker cone means parallel to said phonograph record playing surface and being normally biased out of engagement with said speaker cone means by said third spring means, said pickup arm comprising a second protrusion extending upwardly therefrom substantially normal to said phonograph record playing surface and being pivotally movable with said pickup arm, said speaker cone means comprising a lift bar means for enabling said speaker cone means to be urged out of engagement with said pickup arm by said second cam means as said nestable cam surfaces are driven out of nesting engagement, said second spring means resiliently urging said lift bar means into supporting contact with said pickup arm second protrusion, said lift bar means comprising a third protrusion extending downwardly therefrom substantially normal to said phonograph record playing surface and normally disposable above said rotating first protrusion when said lift bar means is in said supporting contact with said pickup arm second protrusion, said lift bar means further comprising an aperture for receiving said second protrusion therein, said second protrusion being pivotally movable with said pickup arm, said lift bar means aperture being located above said phonograph record adjacent the end of said phonograph record recording, said second protrusion being receivable in said lift bar means aperture when said pickup arm is adjacent the end of said phonograph record recording for enabling said resiliently urged lift bar means to drop a sufficient amount in the direction of said phonograph record to enable said first and third protrusions to become engageable for halting rotation of said second floating cam means when said pickup arm is adjacent the end of said phonograph record recording, said turntable and said first cam means still being rotatable when said first and third protrusions are in engagement, said rotating first cam means at least one upper peripheral cam surface being driven out of nesting engagement with said second cam means at least one lower peripheral cam surface during rotation of said turntable when said first and third protrusions are in engagement, said second cam means at least one sloped lower peripheral cam surface rising up said at least one sloped first peripheral cam surface as said cam surfaces are driven out of said nesting engagement to enable sufficient contact of said second cam means with said speaker cone means to overcome said second spring means biasing force and urge said speaker cone means out of engagement with said pickup arm to raise said lift bar means aperture above said second protrusion and enable said pickup arm to be resiliently reset to the periphery of said phonograph record by said first spring means while returning said lift bar means to said supporting contact with said pickup arm second protrusion, thereby disengaging said first and third protrusions.

2. An improved toy phonograph in accordance with claim 1 wherein said first cam means comprises a pair of said congruent nestable upper peripheral cam surfaces spaced apart from each other, and said second cam means comprises a corresponding pair of said sloped lower peripheral cam surfaces with each of said pair of upper peripheral cam surfaces being nestable in a corresponding one of said pair of sloped lower peripheral cam surfaces, both of said sloped lower peripheral cam surfaces substantially simultaneously rising up said corresponding sloped first peripheral cam surfaces as said cam surfaces are driven out of said nesting engagement for providing a distributed upward lift force for said speaker cone means for urging said speaker cone means out of engagement with said pickup arm.

3. An improved toy phonograph in accordance with claim 2 wherein each of said pairs of cam surfaces are substantially 180° apart for providing a substantially equal distributed lift force for said speaker cone means.

4. An improved toy phonograph in accordance with claim 3 wherein said upper peripheral cam surfaces of said pair thereof are substantially mirror images of each other and said lower peripheral cam surfaces of said pair thereof are substantially mirror images thereof.

5. An improved toy phonograph in accordance with claim 2 wherein said housing comprises an overhang portion parallel to said phonograph record and located adjacent the end of said phonograph record recording between said lift bar means and said phonograph record, said overhang portion being spaced above said phonograph record playing surface a sufficient amount for enabling said pickup arm to be removably retained thereunder when said pickup arm second protrusion is received in said lift bar means aperture while subsequently enabling said pickup arm to be resiliently reset to the periphery of said phonograph record by said first spring means when said speaker cone means is urged out of engagement with said pickup arm to raise said lift bar means aperture above said second protrusion.

6. An improved toy phonograph in accordance with claim 5 wherein said overhang portion further comprises a stop member substantially normal thereto for stopping said pivotal movement of said pickup arm at the end of said phonograph record recording.

7. An improved toy phonograph in accordance with claim 5 wherein said lift bar means further comprises an extension portion thereof extending out of said housing for enabling manual resilient reset of said pickup arm to the periphery of said phonograph record by said first spring at any position of said pickup arm along said phonograph record playing surface by lifting said extension portion.

8. An improved toy phonograph in accordance with claim 7 wherein said phonograph comprises drive means for rotatably driving said turntable, said drive means having an on and an off state with said turntable only being driven in said on state, said drive means comprising switch means having an on position and an off position for selecting between said on and said off state, respectively, said extension portion being in operative engagement with said switch means and being liftable thereby when said switch means is in said off position, whereby said pickup arm resilient reset is enabled when said drive means is placed in said off state and said phonograph record recording starts at the beginning thereof when said switch means is subsequently placed in said on position for placing said drive means in said on state.

9. An improved toy phonograph in accordance with claim 2 wherein said lift bar means further comprises an extension portion thereof extending out of said housing for enabling manual resilient reset of said pickup arm to the periphery of said phonograph record by said first spring at any position of said pickup arm along said phonograph record playing surface by depressing said extension.

10. An improved toy phonograph in accordance with claim 2 wherein said phonograph comprises drive means for rotatably driving said turntable, said drive means having an on and an off state with said turntable only being driven in said on state, said drive means comprising switch means having an on position and an off position for selecting between said on and said off state, respectively, said extension portion being in operative engagement with said switch means and being depressable thereby when said switch means is in said off position, whereby said pickup arm resilient reset is enabled when said drive means is placed in said off state and said phonograph record recording starts at the beginning thereof when said switch means is subsequently placed in said on position for placing said drive means in said on state.

11. An improved toy phonograph in accordance with claim 1 wherein said housing comprises an overhang portion parallel to said phonograph record and located adjacent the end of said phonograph record recording between said lift bar means and said phonograph record, said overhang portion being spaced above said phonograph record playing surface a sufficient amount for enabling said pickup arm to be removably retained thereunder when said pickup arm second protrusion is received in said lift bar means aperture while subsequently enabling said pickup arm to be resiliently reset to the periphery of said phonograph record by said first spring means when said speaker cone means is urged out of engagement with said pickup arm to raise said lift bar means aperture above said second protrusion.

12. An improved toy phonograph in accordance with claim 1 wherein said lift bar means further comprises an extension portion thereof extending out of said housing for enabling manual resilient reset of said pickup arm to the periphery of said phonograph record by said first spring means at any position of said pickup arm along said phonograph record playing surface by lifting said extension portion.

13. An improved toy phonograph in accordance with claim 12 wherein said phonograph comprises drive means for rotatably driving said turntable, said drive means having an on and an off state with said turntable only being driven in said on state, said drive means comprising switch means having an on position and an off position for selecting between said on and said off state, respectively, said extension portion being in operative engagement with said switch means and being liftable thereby when said switch means is in said off position, whereby said pickup arm resilient reset is enabled when said drive means is placed in said off state and said phonograph record recording starts at the beginning thereof when said switch means is subsequently placed in said on position for placing said drive means in said on state.

14. An improved toy phonograph in accordance with claim 1 wherein said disengagement of said first and third protrusions enables said first and second cam means to return to said nesting engagement and said speaker cone means to return to contact with said pickup arm.

15. An improved toy phonograph in accordance with claim 1 wherein said first spring means further tends to urge said pickup arm out of engagement with said phonograph record, said second spring means overcoming said first spring means further tendency except when said first and third protrusions are in engagement with said pickup arm, whereby said pickup arm is urged out of engagement with said phonograph record during said pickup arm reset.

16. An improved toy phonograph in accordance with claim 1 wherein said phonograph record is removably mounted on the turntable.

17. In a toy phonograph comprising a housing, said housing comprising a base, a turntable rotatably mounted on said base for rotation a phonogrph record mounted on said turntable about an axis of rotation, a pickup arm pivoted at one end engageable with a playing surface of said phonograph record, said phonograph record having a periphery, a first spring means, said pickup arm being constantly placed under a force of said first spring means which urges said pickup arm toward the periphery of said phonograph record, a speaker cone means resiliently mounted on said housing above said pickup arm, and second spring means resiliently urging said speaker cone means into contact with said pickup arm with a biasing force for pressing said pickup arm into engagement with said phonograph record for reproducing recorded sound from said phonograph record playing surface; the improvement comprising a first cam means axially mounted on said turntable axis of rotation and fixedly rotatable therewith, a second cam means nestable with said first cam means for rotation therewith when in nested engagement therewith, said second cam means being a floating cam means comprising at least one lower peripheral cam surface sloped with respect to said turntable, said first cam means having at least one congruent upper peripheral cam surface nestable with said second cam means at least one peripheral cam surface, third spring means resiliently urging said second floating cam means at least one lower peripheral cam surface into nesting engagement with said first cam means at least one upper peripheral cam surface, said second floating cam means comprising a first protrusion extending outwardly therefrom beneath said speaker cone means parallel to said phonograph record playing surface and being normally biased out of engagement with said speaker cone means by said third spring means, said pickup arm comprising a second protrusion extending upwardly therefrom substantially normal to said phonograph record playing surface and being pivotally movable with said pickup arm, said speaker cone means comprising a lift bar means for enabling said speaker cone means to be urged out of engagement with said pickup arm by said second cam means as said nestable cam surfaces are driven out of nesting engagement, said second spring means resiliently urging said lift bar means into supporting contact with said pickup arm second protrusion, said lift bar means comprising a third protrusion extending downwardly therefrom substantially normal to said phonograph record playing surface and normally disposable above said rotating first protrusion when said lift bar means is in said supporting contact with said pickup arm second protrusion, said second protrusion being pivotally movable with said pickup arm, said lift bar means further comprising means to drop said lift bar towards said phonograph record when said pickup arm is adjacent the end of said phonograph record recording, causing said first and third protrusions to engage halting rotation of said second floating cam means, said turntable and said first cam means still being rotatable when said first and third protrusions are in engagement, said rotating first cam means at least one upper peripheral cam surface being driven out of nesting engagement with said second cam means at least one lower peripheral cam surface during rotation of said turntable when said first and third protrusions are in engagement, said second cam means at least one sloped lower peripheral cam surface rising up said at least one sloped first peripheral cam surface as said cam surfaces are driven out of said nesting engagement to enable sufficient contact of said second cam means with said speaker cone means to overcome said second spring means biasing force and urge said speaker cone means out of engagement with said pickup arm to raise said lift bar means above said second protrusion and enable said pickup arm to be resiliently reset to the periphery of said phonograph record by said first spring means while returning said lift bar means to said supporting contact with said pickup arm second protrusion, thereby disengaging said first and third protrusions, said lift bar means further comprising an extension portion thereof extending out of said housing for enabling manual resilient reset of said pickup arm to the periphery of said phonograph record by said first spring at any position of said pickup arm along said phonograph record playing surface by lifting said extension portion.

* * * * *